United States Patent
Lee

(10) Patent No.: US 10,147,162 B2
(45) Date of Patent: Dec. 4, 2018

(54) METHOD AND SYSTEM FOR RECOGNIZING POI OUTSIDE MAP SCREEN

(71) Applicant: LINE Corporation, Shibuya-ku, Tokyo (JP)

(72) Inventor: SeungJun Lee, Seongnam-si (KR)

(73) Assignee: Line Corporation, Tokyo (JP)

( * ) Notice: Subject to any disclaimer, the term of this patent is extended or adjusted under 35 U.S.C. 154(b) by 0 days.

(21) Appl. No.: 15/205,123

(22) Filed: Jul. 8, 2016

(65) Prior Publication Data

US 2017/0091901 A1    Mar. 30, 2017

(30) Foreign Application Priority Data

Sep. 30, 2015 (KR) .......................... 10-2015-0137657

(51) Int. Cl.
| | | |
|---|---|---|
| *G06T 3/20* | (2006.01) | |
| *G06F 3/0484* | (2013.01) | |
| *G06T 3/60* | (2006.01) | |
| *G06T 11/60* | (2006.01) | |

(52) U.S. Cl.
CPC ............ *G06T 3/20* (2013.01); *G06F 3/04845* (2013.01); *G06T 3/60* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 8,239,130 B1* | 8/2012 | Upstill ............... | G01C 21/3679 701/400 |
| 2010/0058225 A1* | 3/2010 | Lin ...................... | G09B 29/106 715/785 |
| 2011/0238288 A1* | 9/2011 | Li ....................... | G01C 21/3679 701/533 |
| 2012/0176410 A1* | 7/2012 | Meier .................... | G06F 3/011 345/633 |
| 2012/0254186 A1* | 10/2012 | Winner ............... | G06F 17/3087 707/740 |
| 2013/0173154 A1 | 7/2013 | Wither et al. | |

(Continued)

FOREIGN PATENT DOCUMENTS

| | | |
|---|---|---|
| JP | 2015503740 A | 2/2015 |
| KR | 20080094369 A | 10/2008 |
| KR | 20120067830 A | 6/2012 |

*Primary Examiner* — Michael J Cobb
(74) *Attorney, Agent, or Firm* — Harness, Dickey & Pierce, P.L.C.

(57) ABSTRACT

Methods, systems, and/or non-transitory computer-readable mediums for recognizing point of interest (POI) or POIs outside a map screen may be provided. For example, a method including displaying, at an electronic device, a map received from a server over a network on a screen of the electronic device under control of an application installed on the electronic device, receiving, at the electronic device, search results including POIs corresponding to a setting condition from the server over the network, displaying, on the screen, a first POI corresponding to a location within the map displayed on the screen among the POIs included in the search results, and representing, on the screen, at least one second POI outside the map displayed on the screen using an indicator, the at least one second POI among the POIs included in the search results, may be provided.

16 Claims, 17 Drawing Sheets

(56) References Cited

U.S. PATENT DOCUMENTS

| | | | |
|---|---|---|---|
| 2014/0337477 A1* | 11/2014 | Fisher | H04L 65/601 709/219 |
| 2015/0187100 A1* | 7/2015 | Berry | G06T 11/20 345/634 |
| 2015/0193446 A1* | 7/2015 | Barnett | G06F 17/30061 715/234 |
| 2015/0377628 A1* | 12/2015 | Arokiaraj | G01C 21/367 701/532 |

* cited by examiner

METHOD AND SYSTEM FOR RECOGNIZING POI OUTSIDE MAP SCREEN

CROSS-REFERENCE TO RELATED APPLICATION(S)

This application claims priority under 35 U.S.C. § 119 to Korean Patent Application No. 10-2015-0137657 filed Sep. 30, 2015, in the Korean Intellectual Property Office (KIPO), the entire contents of which are incorporated herein by reference.

BACKGROUND

Field

One or more example embodiments relate to technology for recognizing a point of interest (POI) outside a map screen.

Description of Related Art

Recently, various types of map services are provided using Internet communication technology, satellite measurement technology, map information technology, search engine technology, and the like, and/or combinations thereof.

In general, a map service may provide a map of an area requested from a user based on a defined scale. Because a portal search service provides such map services, many users are using the map services as search methods.

In the map service, many points of interest (POIs) may be present outside a screen area due to a limited size of a map screen. To verify a POI or POIs outside a map area, a user may need to find a desired POI by moving a center of a map using a drag and the like without having a hint or guide about a location or a direction of the POI.

SUMMARY

One or more example embodiments provide methods, systems, and/or non-transitory computer-readable medium that may relatively easily recognize a direction and a location of a point of interest (POI) outside a map screen.

According to at least one example embodiment, a method includes displaying, at an electronic device, a map received from a server over a network on a screen of the electronic device under control of an application installed on the electronic device, receiving, at the electronic device, search results including POIs corresponding to a setting condition from the server over the network, displaying, on the screen, a first POI corresponding to a location within the map displayed on the screen among the POIs included in the search results, and representing, on the screen, at least one second POI outside the map displayed on the screen using an indicator, the second POI among the POIs included in the search results.

According to at least one example embodiment, a method includes providing data for displaying a map on a screen of an electronic device to the electronic device over a network, searching for POIs corresponding to a setting condition and providing search results to the electronic device, providing information about at least one POI outside the map displayed on the screen of the electronic device among POIs included in the search results to the electronic device, displaying on the screen a first POI corresponding to a location within the map displayed on the screen among the POIs included in the search results, and representing on the screen using an indicator at least one second POI outside the range of the map displayed on the screen.

According to at least one example embodiment, a system includes a memory configured to store computer-readable instructions, and at least one processor configured to execute the computer-readable instructions such that the at least one processor is configured to control the server to provide data for displaying a map on a screen of an electronic device to the electronic device over a network, control the server to search for POIs corresponding to a setting condition and to provide search results to the electronic device, control the server to provide information about at least one POI outside the map displayed on the screen of the electronic device among POIs included in the search results to the electronic device, control the electronic device to display a first POI corresponding to a location within the map displayed on the screen among the POIs included in the search results on the screen, and representing on the screen using an indicator a second POI outside the range of the map displayed on the screen among the POIs included in the search results According to at least some example embodiments, it is possible to enable a user to relatively easily recognize a POI outside a map screen by configuring an indicator indicating a direction and a location of a POI outside a screen with respect to a center of a map and by indicating the indicator on the screen.

According to at least some example embodiments, it is possible to display an appropriate number of indicators on a map screen by clustering POIs outside the map screen based on a direction from a center location of a screen and by applying a single indicator to the clustered POIs.

Further areas of applicability will become apparent from the description provided herein. The description and specific examples in this disclosure are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified. In the figures.

Figure 1:
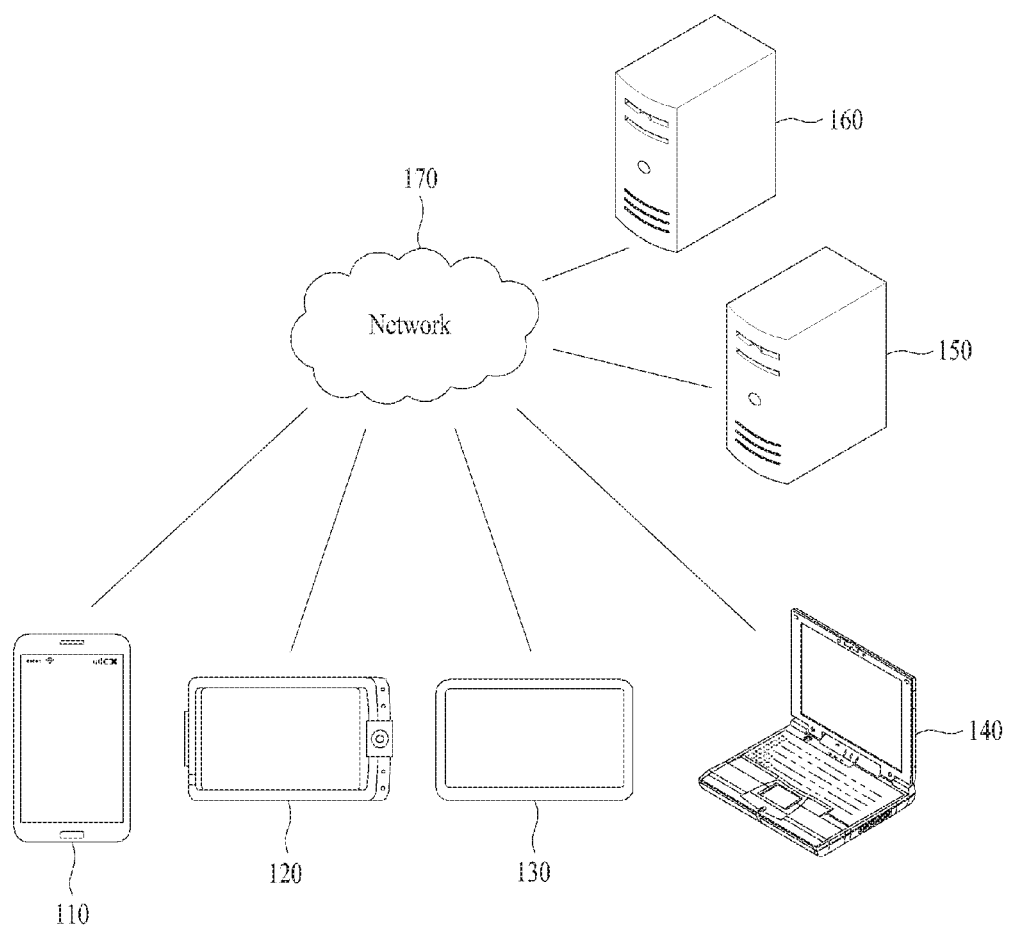
FIG. 1 is a diagram illustrating a network environment according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given example embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may be performed simultaneously, or in some cases be performed in reverse order.

Units and/or devices according to one or more example embodiments may be implemented using hardware, and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, a set of operations and/or functions of various functional units may be performed by one functional unit. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device, however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Example embodiments relate to technology for recommending a meeting place using appointment information. In detail, the example embodiments relate to a method, system, and non-transitory computer-readable medium that may provide appointment information of a meeting users are to attend to affiliated stores, may receive a recommendation on a meeting place from the affiliated stores, and may provide the received recommendation information to the users.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, the number of electronic devices and/or the number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, navigation, a computer, a laptop computer, a digital broadcasting terminal, a personal digital assistant (PDA), a portable multimedia player (PMP), a tablet PC, and the like. For example, the electronic device 110 may communicate with other electronic devices 120, 130, and 140, and/or the servers 150 and/or 160 over the network 170 in a wired communication manner or in a wireless communication manner.

The communication scheme is not particularly limited and may include a communication scheme that uses near field communication between devices as well as a communication method using a communication network, for example, a mobile communication network, the wired Internet, the wireless Internet, and a broadcasting network. For example, the network 170 may include at least one of networks, for example, a personal area network (PAN), a local area network (LAN), a campus area network (CAN), a metropolitan area network (MAN), a wide area network (WAN), a broadband network (BBN), the Internet, and the like. Also, the network 170 may include at least one of network topologies that include a bus network, a star network, a ring network, a mesh network, a star-bus network, a tree or hierarchical network, and the like. However, these are only examples and the example embodiments are not limited thereto.

Each of the servers 150 and 160 may be configured as a computer apparatus or a plurality of computer apparatuses that provides instructions, codes, files, content, services, and the like, through communication with the plurality of electronic devices 110, 120, 130, and/or 140 over the network 170.

For example, the server 160 may provide a file for installing an application to the electronic device 110 connected over the network 170. In this case, the electronic device 110 may install the application using the file provided from the server 160. The electronic device 110 may use a service and/or content provided from the server 150 by connecting to the server 150 under control of an operating system (OS) included in the electronic device 110 and at least one program, for example, browser or the installed application. For example, in response to a service request message transmitted from the electronic device 110 to the server 150 over the network 170 under control of the application, the server 150 may transmit a code corresponding to the service request message to the electronic device 110. The electronic device 110 may provide content to a user by displaying a code-based screen under control of the application.

Figure 2:
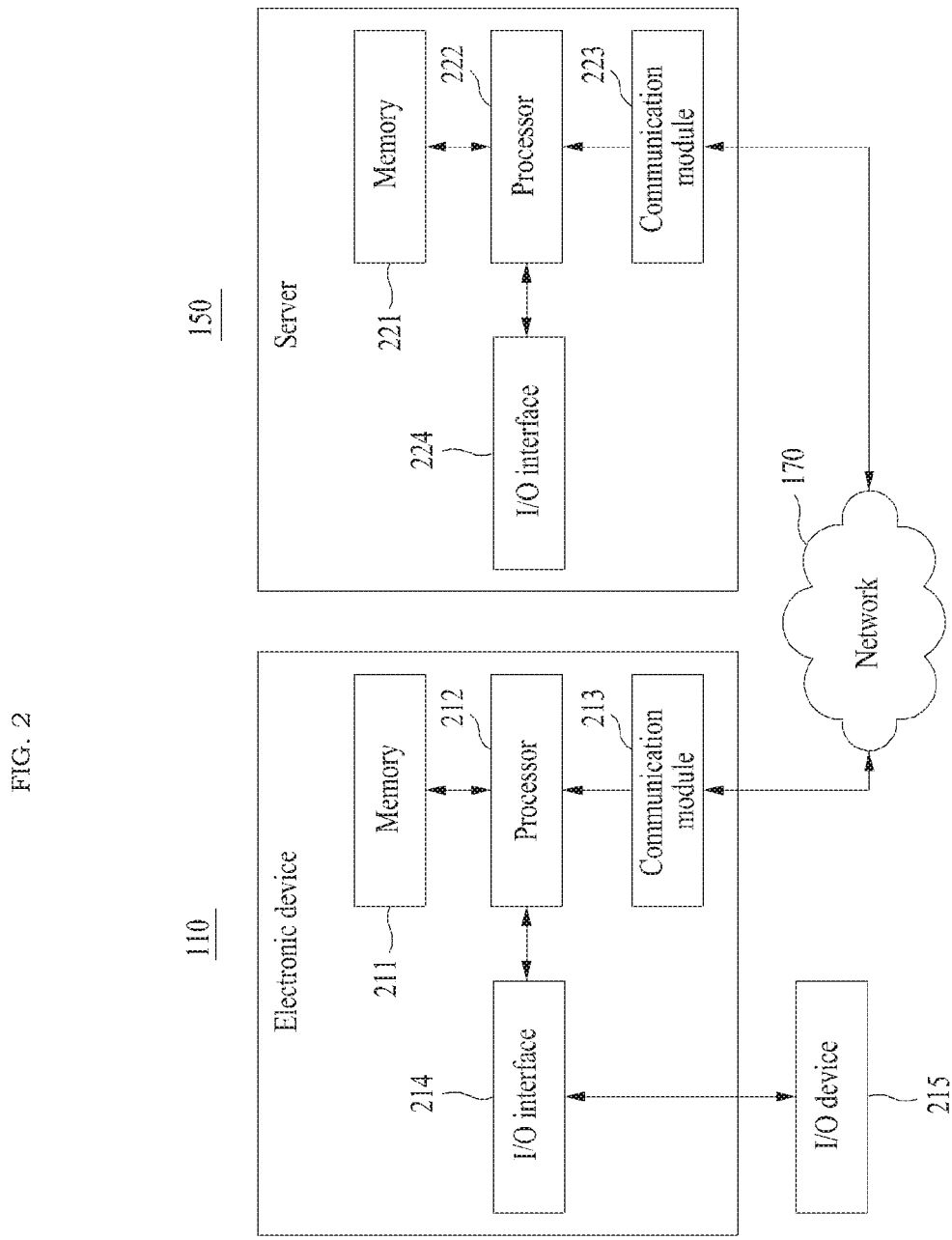
FIG. 2 is a block diagram illustrating a configuration of an electronic device and a server according to at least one example embodiment.

FIG. 2 is a block diagram illustrating a configuration of an electronic device and a server according to at least one example embodiment. Also, FIG. 2 illustrates a configuration of the electronic device 110 as an example for a single electronic device and illustrates a configuration of the server 150 as an example for a single server. The other electronic devices 120, 130, and 140, and/or the other server 160 may have the same or similar configuration to the electronic device 110 and/or the server 150.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. The memory 211, 221 may include a permanent mass storage device such as random access memory (RAM), read only memory (ROM), or a disk drive, as a computer-readable storage medium. Also, an OS and at least one program code, for example, computer-readable instructions for the browser or the application installed and executed on the electronic device 110, may be stored in the memory 211, 221. Such software constituent elements may be loaded from another computer-readable storage medium separate from the memory 211, 221 using a drive mechanism. The other computer-readable storage medium may include, for example, a floppy drive, a disk, a tape, a DVD/CD-ROM drive, a memory card, etc. According to other example embodiments, software constituent elements may be loaded to the memory 211, 221 through the communication module 213, 223, instead of, or in addition to, the computer-readable storage medium. For example, at least one program may be loaded to the memory 211, 221 based on a program, for example, the application installed by files, which are provided over the network 170 from developers or a file distribution system, for example, the server 150 of FIG. 1 that provides an installation file of the application.

The processor 212, 222 may be configured to process computer-readable instructions, for example, the aforementioned at least one program code, of a computer program by performing basic arithmetic operations, logic operations, and I/O operations. The computer-readable instructions may be provided from the memory 211, 221 and/or the communication module 213, 223 to the processor 212, 222. For example, the processor 212, 222 may be configured to execute the received instructions in response to the program code stored in the storage device such as the memory 211, 222.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request generated based on a program code stored in the storage device such as the memory 211, to the server 150 over the network 170 under control of the communication module 213. A control signal, an instruction, content, a file, etc., provided under control of the processor 222 of the server 150 may be received at the electronic device 110 through the communication module 213 of the electronic device 110 by going through the communication module 223 and the network 170. For example, a control signal and an instruction of the server 150 received through the communication module 213 may be transferred to the processor 212 or the memory 211, and content and a file may be stored in a storage medium, which may be further included in the electronic device 110.

The I/O interface 214, 224 may be a device used for interface with an I/O device 215. For example, an input device may include a keyboard, a mouse, etc., and an output device may include a device, such as a display for displaying a communication session of an application. As another example, the I/O interface 214 may be a device for interface with an apparatus in which an input function and an output function are integrated into a single function, for example, a touch screen. In detail, when processing instructions of the computer program loaded to the memory 211, the processor 212 of the electronic device 110 may display a service screen configured using data provided from the server 150 or the other electronic device 120, or may display content on a display through the I/O interface 214.

According to some example embodiments, the electronic device 110 and the server 150 may include a greater or lesser number of constituent elements than the number of constituent elements shown in FIG. 2. For example, the electronic device 110 may include at least a portion of the I/O devices 215, or may further include other constituent elements, for example, a transceiver, a global positioning system (GPS) module, a camera, a variety of sensors, a database, and the like.

Figure 3:
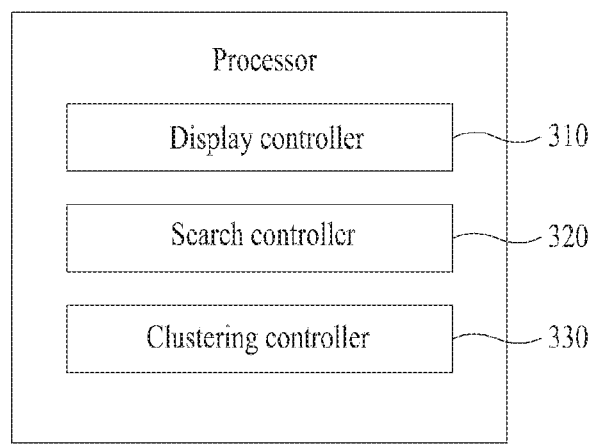
FIG. 3 is a block diagram illustrating an example of constituent elements included in a processor of an electronic device according to at least one example embodiment.
Figure 4:
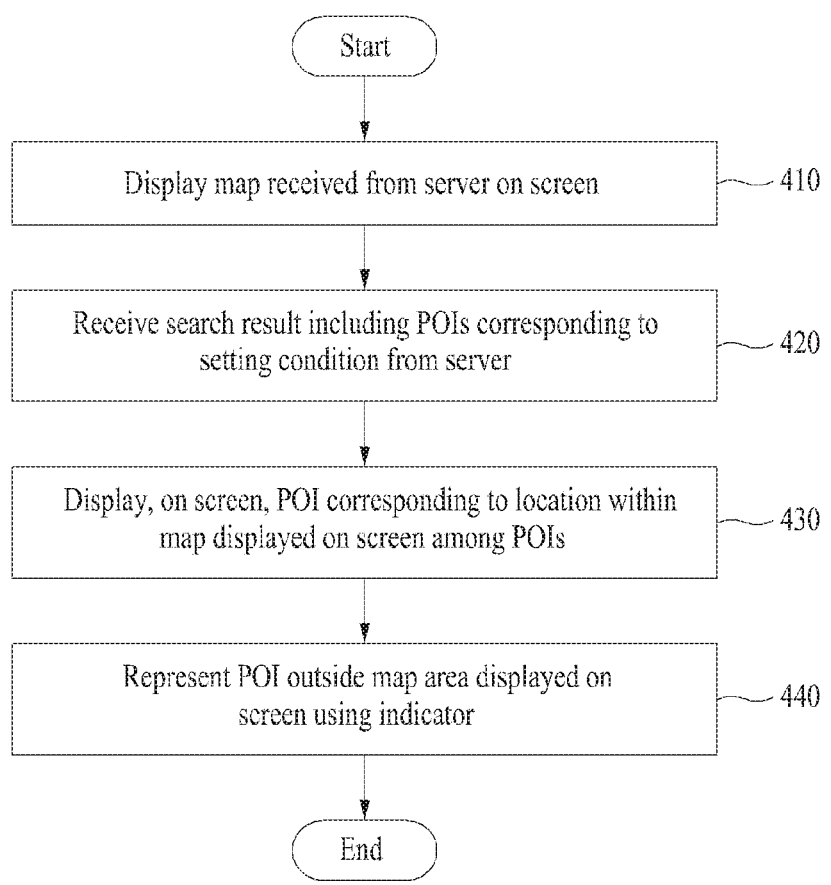
FIG. 4 is a flowchart illustrating a map display method performed at an electronic device according to at least one example embodiment.

FIG. 3 is a block diagram illustrating an example of constituent elements included in a processor of an electronic device according to at least one example embodiment, and FIG. 4 is a flowchart illustrating a map display method performed at an electronic device according to at least one example embodiment. Referring to FIG. 3, the processor 212 of the electronic device 110 may include a display controller 310, a search controller 320, and a clustering controller 330. Depending on example embodiments, a portion of the constituent elements may be omitted or a constituent element may be further included. The constituent elements of the processor 212 may control the electronic device 110 to perform operations 410 through 440 included in the map display method of FIG. 4, and may be configured to operate based on at least one program code and an operating system (OS) included in the memory 211. The at least one program code may include a code of an application installed and executed on the electronic device 110 to provide a service of the server 150 to the electronic device 110. Further, the map display method illustrated in FIG. 4 may include an additional operation. The server 150 may transmit a code for controlling the server 150 to the electronic device 110 to configure a map screen. In response to the code received from the server 150, the electronic device 110 may configure and display the map screen.

The electronic device 110 may request the server 150 for a map service by connecting to the server 150 over the network 170 under control of an application executed on the electronic device 110. In response to the request from the electronic device 110, the server 150 may transmit a code for providing a corresponding map to the electronic device 110. Here, the application may correspond to the at least one program code.

In operation 410, the electronic device 110 may display a map received from the server 150 on a screen of the electronic device 110 by configuring a map screen based on a code received from the server 150 and by displaying the map screen on a display under control of an application. The display controller 310 may control the electronic device 110 to perform operation 410. For example, the electronic device 110 may display a partially enlarged map based on the code received from the server 150. For example, in response to selecting a desired area or point on a map displayed on the screen, the electronic device 110 may configure a map screen on which a partial area is enlarged at a desired (or alternatively, predetermined) zoom level based on the selected area or point, and may display the map screen on the screen of the electronic device 110.

In operation 420, the electronic device 110 may request the server 150 to search for POIs corresponding to a setting condition. In response to the request from the electronic device 110, the server 150 may search for POIs corresponding to the request and may transmit search results including the POIs corresponding to the setting condition to the electronic device 110. The search controller 320 may control the electronic device 110 to perform operation 420. For example, the electronic device 110 may request a POI search corresponding to a variety of setting conditions, such as searching for a POI associated with a keyword, searching for a location of a friend having allowed a location share, searching for a neighboring POI based on a reference location (e.g., a current location of a user), and the like. The POI search conditions are provided as an example only and any search condition capable of specifying a POI on the map may be applicable.

In operation 430, the electronic device 110 may display, on the screen of the electronic device 110, a POI corresponding to a location within a map area displayed on the screen of the electronic device 110 (e.g., a POI (hereinafter, a first POI) present within a valid display area of the map), among the POIs included in the search results received from the server 150. The display controller 310 may control the electronic device 110 to perform operation 430. The POIs corresponding to the setting condition may include a POI located on the map area displayed on the screen of the electronic device 110 and a POI outside the currently displayed map range.

In operation 440, the electronic device 110 may represent, on the screen of the electronic device 110, a POI outside the map area displayed on the screen of the electronic device 110, (e.g., a POI (hereinafter, a second POI) present outside the valid display area of the map), among the POIs included in the search results received from the server 150. The display controller 310 may control the electronic device 110 to perform operation 440. For example, the electronic device 110 may indicate an indicator at a location corresponding to a second POI on the map screen. As another example, the electronic device 110 may display information about at least one of a direction or a distance associated with the second POI based on a center location of the map screen using the indicator represented on the map screen.

Figure 5:
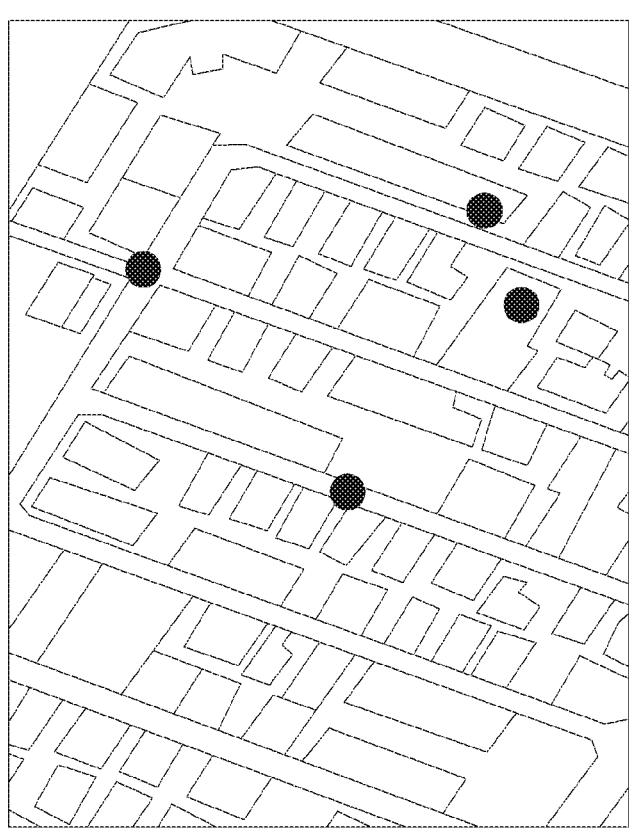
FIGS. 5 and 6 illustrate examples of a point of interest (POI) outside the range of a map displayed on a screen according to some example embodiment.

FIG. 5 illustrates an example of a map screen 500, on which a map is displayed, displayed on an electronic device according to at least one example embodiment. The map screen 500 may be configured based on information provided from the server 150. Referring to FIG. 5, the electronic device 110 may configure and display the map screen 500 based on a code received from the server 150, and may display POIs 501 corresponding to a setting condition on the map screen 500, as search results received from the server 150.

Figure 6:

FIG. 6 illustrates an example of describing a state of an enlarged map displayed on an electronic device according to at least one example embodiment. Referring to FIG. 6, the electronic device 110 displays a map screen 600-1 including POIs, for example, a first POI 601 and second POIs 602, of a desired (or alternatively, predetermined) condition, and in response to a zoom request for the map screen 600-1, displays a map screen 600-2 on which a partial area 610 of a map area displayed on the map screen 600-1 is enlarged.

A user may use the map screen 600-2 in a partially enlarged state through a zoom mode while viewing the map screen 600-1 including the first and second POIs 601 and 602 on the screen of the electronic device 110. Here, some of the POIs being viewed on the map screen 600-1 may be outside a valid display area in an enlarged map state and be out of sight on the map screen 600-2.

On the enlarged map screen 600-2, the user may verify the first POI 601 present within the display area. However, to verify a POI, for example, the second POI 602 outside the display range of the enlarged map screen 600-2, the user may search for the second POI 602 by moving a map center with roughly guessing a location of the second POI 602 on the map screen 600-1. According to some example embodiments, a function that enables the user to relatively recognize information about an approximate direction and location of a POI outside the range of a map displayed on the screen of the electronic device 110 on a current map screen may be provided.

Figure 7:
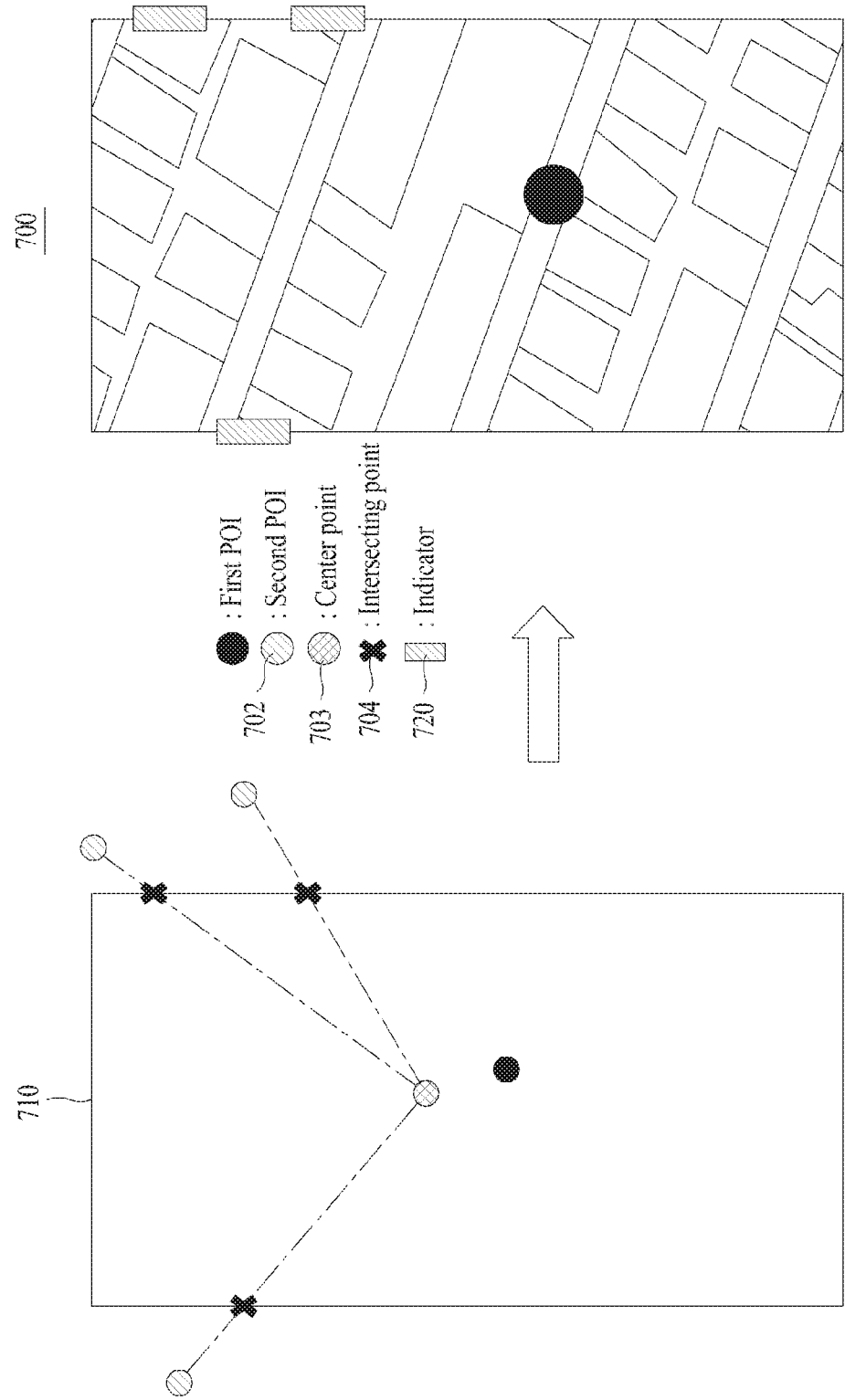
FIGS. 7 and 8 illustrate examples of a process of configuring an indicator indicating a POI outside a map screen according to some example embodiments.

FIG. 7 illustrates an example of a process of representing an indicator on a map screen, which is displayed on an electronic device, according to at least one example embodiment.

FIG. 7 illustrates a valid display area 710 of a map screen displayed on the electronic device 110. The electronic device 110 generates a virtual straight line that connects a center point 703 of the valid display area 710 to a location of a second POI 702 outside the valid display area 710. The electronic device 110 maps an intersecting point 704, which is a point at which the virtual straight line intersects a line corresponding to an edge of the valid display area 710. The electronic device 110 may represent an indicator 720 at a location of a coordinate of the interesting point 704 mapped to the line corresponding to the edge of the valid display area 710 so that the user may relatively easily recognize a location and/or a direction of the second POI 702 present outside a corresponding screen range on an enlarged map screen 700.

Accordingly, the indicator 720 may indicate a location and/or a direction of the second POI 702 on the enlarged map screen 700 by indicating the indicator 720 at each point at which the virtual straight line connecting the center point 703 and the second POI 702 to the line corresponding to the edge of the valid period area 710 intersect.

Figure 8:
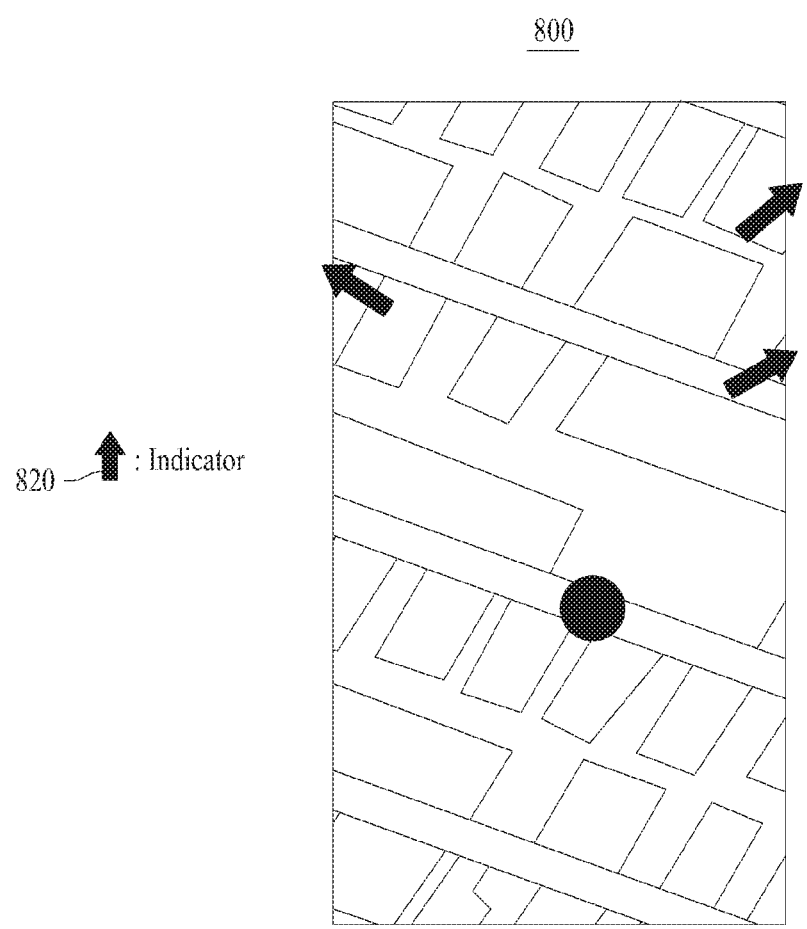

According to some example embodiments, when displaying an enlarged map screen, the electronic device 110 may represent a direction associated with a second POI based on a center point of the screen using an indicator. For example, the electronic device 110 may indicate a direction of the second POI from a center location of the screen on the indicator using a symbol, a figure, a text, etc. As another example, the electronic device 110 may also configure and display the indicator using a symbol or a figure that has a directivity, such as an arrow indicator and the like. Referring to FIG. 8, with respect to a second POI, the electronic device 110 may configure an indicator 820 displayed on an enlarged map screen 800 with an arrow indicator indicating a direction from a center location of a screen. Accordingly, the electronic device 110 enables a user to relatively easily recognize an accurate direction of a POI outside the screen range of the enlarged map screen using an indicator including information about the direction of the second POI.

Also, the indicator may further include information about a distance between a center point of a valid display area and the second POI. For example, the electronic device 110 may indicate the distance between the center point and the second POI by applying a text form, a gauge format gradation, etc., on the indicator. As another example, the electronic device 110 may define a color, a brightness, etc., for each distance range, and may represent the indicator by applying a color, a brightness, etc., corresponding to the distance between the center point and the second POI. The aforementioned indicator representation method is not limited to the above examples and any type of representation methods indicating a location, a direction, a distance, etc., associated with the second POI may be applicable.

If a map displayed on the screen rotates, the electronic device 110 may move an indicator indicated on the map screen in a rotation direction and thereby display the indicator. Accordingly, the electronic device 110 may also move and indicate an indicator with respect to a second POI outside the range of a map according to a rotation of the map.

The electronic device 110 may configure the indicator for the second POI as an action button for moving a center of the map displayed on the screen of the electronic device 110 to an area that includes the second POI. That is, in response to a user selection on a desired indicator on an enlarged map screen 800, the electronic device 110 may move to a center of a corresponding area by automatically switching to a zoom level so that the second POI indicated by the selected indicator is in sight.

If many second POIs are outside the range of a map displayed on the screen of the electronic device 110, the number of indicators corresponding to the number of second POIs also increases. To display an appropriate number of indicators on the screen of the electronic devices 110, POIs outside a screen based on a center of a map may be clustered and POIs clustered into a single cluster may be represented using a single indicator.

Figure 9:
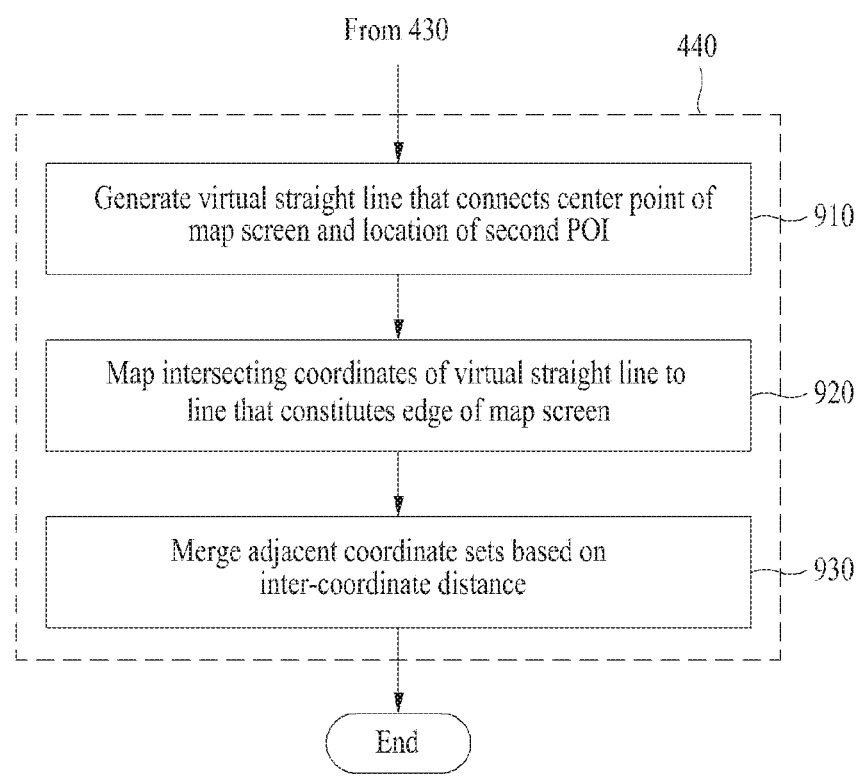
FIG. 9 is a flowchart illustrating an indicator representation method through POI clustering according to at least one example embodiments.

FIG. 9 is a flowchart illustrating an indicator representation method through POI clustering according to at least one example embodiment. The indicator representation method of FIG. 9 may be included in operation 440 of FIG. 4. The display controller 310 may control the electronic device 110 to perform operations 910 through 930 included in the indicator representation method. The server 150 may transmit, to the electronic device 110, a code for controlling the server 150 so that the electronic device 110 performs clustering of some of second POIs and an indicator configuration. In response to the code received from the server 150, the electronic device 110 may process clustering of second POIs and indicator configuration and may represent the clustered second POIs using an indicator on the screen.

In operation 910, the electronic device 110 may generate one or more virtual straight lines that connect a center point of a map screen to one or more locations of one or more second POIs outside a map area displayed on the screen of the electronic device 110.

In operation 920, the electronic device 110 may map intersecting coordinates, at which the one or more virtual straight lines generated in operation 910 intersect with a line that constitutes an edge of the map screen. For example, if the map screen is in a rectangular shape, the electronic device 110 may individually process the respective four straight lines that constitute the edge of the map screen, and may map intersecting coordinates of each of the generated virtual straight lines to the line (e.g., the edge of the map screen). The map screen in the rectangular shape is provided as an example only and the aforementioned coordinates mapping process may be applicable to a map screen in a circular shape or various polygonal shapes.

In operation 930, the electronic device 110 may extract the indicator by performing an indicator merging operation on some of the intersecting coordinates. For example, the electronic device 110 may merge, into a single cluster, adjacent intersecting coordinates based on respective inter-coordinate distances between the intersecting coordinates mapped to the line that constitutes the edge of the map screen, and may merged the coordinates into the single cluster and represent the single cluster using a single indicator.

Figure 10:
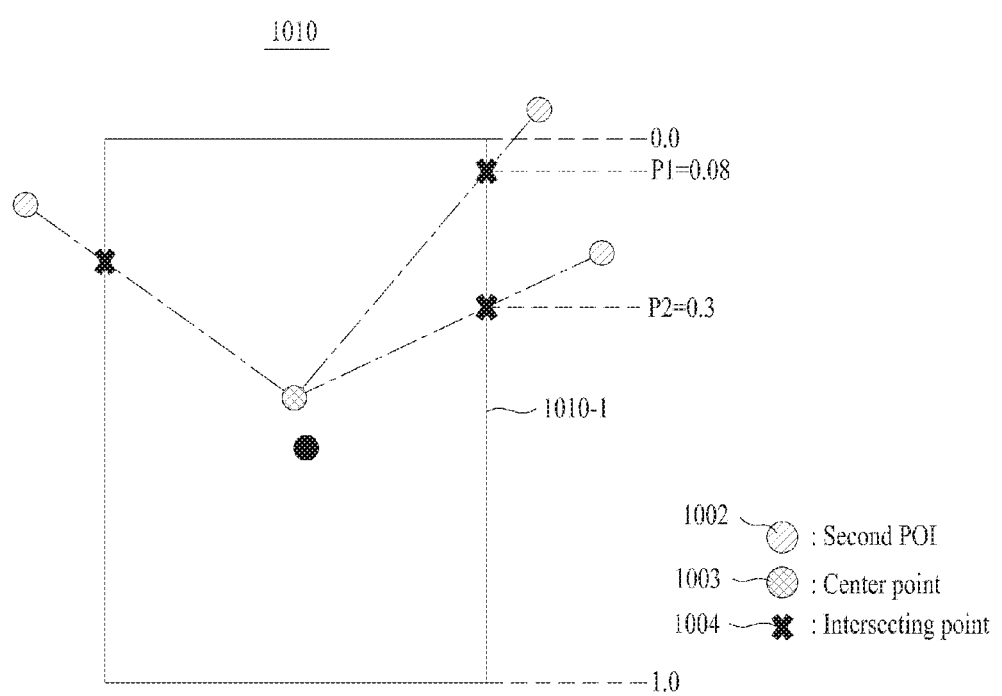
FIGS. 10 through 12 illustrate examples of a process of configuring an indicator for clustered POIs according to at least one example embodiment.

FIG. 10 illustrates an example of an indicator merging operation according to at least one example embodiment. In FIG. 10, a straight line 1010-1 refers to one of four straight lines that constitute an edge of a valid display area 1010 on which a map is displayed on the electronic device 110.

Referring to FIG. 10, the electronic device 110 may map coordinates of an intersecting point 1004 of a virtual straight line, which connects a center point 1003 of the valid display area 1010 to a location of a second POI 1002, with the straight line 1010-1. An offset value may be set for the straight line 1010-1 (e.g., an edge of the valid display area 1010). For example, a coordinate offset value may be determined by setting a starting point as 0.0 and an end point as 1.0. The electronic device 110 may convert each of intersecting coordinates mapped to the straight line 1010-1 to a decimal between 0.0 and 1.0 (e.g., a relative offset value from the start point of the straight line 1010-1), and may sort the coordinate sets. The electronic device 110 may start an operation from a first coordinate offset value P1 and may calculate a difference between the first coordinate offset value P1 and a second coordinate offset value P2. If the difference between P1 and P2 is less than a threshold value, the electronic device 110 may tag a unique value corresponding to a single cluster so that the two intersecting coordinates are indictable using the same indicator. A subsequent operation may be performed based on the second coordinate offset value P2. The electronic device 110 may perform the indicator merging operation by iterating the above process with circulating all of the sorted coordinate sets.

If the first offset value P1 is 0.08 and the second offset value P2 is 0.3 based on offset values 0.0 to 1.0 of the straight line 1010-1, and P2-P1 is less than a threshold value, for example, 0.3, the electronic device 110 may merge the two coordinate sets into a single cluster.

Although the example embodiment describes that the indicator merging operation is individually performed on each of the straight lines that constitute the edge of the valid display area 1010, the electronic device 110 may perform the indicator merging operation at a time with respect to the entire straight lines that constitute the edge of the valid display area 1010 by regarding the four straight lines as a single continuous line and by designing an offset value thereto.

The electronic device 110 may perform clustering with respect to all of the second POIs outside the range of a map. To reduce a calculation amount, the electronic device 110 may selectively cluster second POIs present within a desired (or, alternatively, predetermined) radius from a reference point among the entire second POIs. In this example, the reference point for selecting one or more second POIs used for an operation may indicate a center of the map displayed on the screen of the electronic device 110 (e.g., a current location or a preset setting range specified at the electronic device 110).

The electronic device 110 may represent coordinate sets merged into a single cluster through a merging operation using a single indicator. Here, a location and a size of the indicator may be determined based on the number of coordinate sets merged into the single cluster, and/or a minimum offset value and a maximum offset value among the coordinate sets. The indicator of the cluster may be represented on a line that constitutes an edge of the map screen based on the determined location and size.

Figure 11:
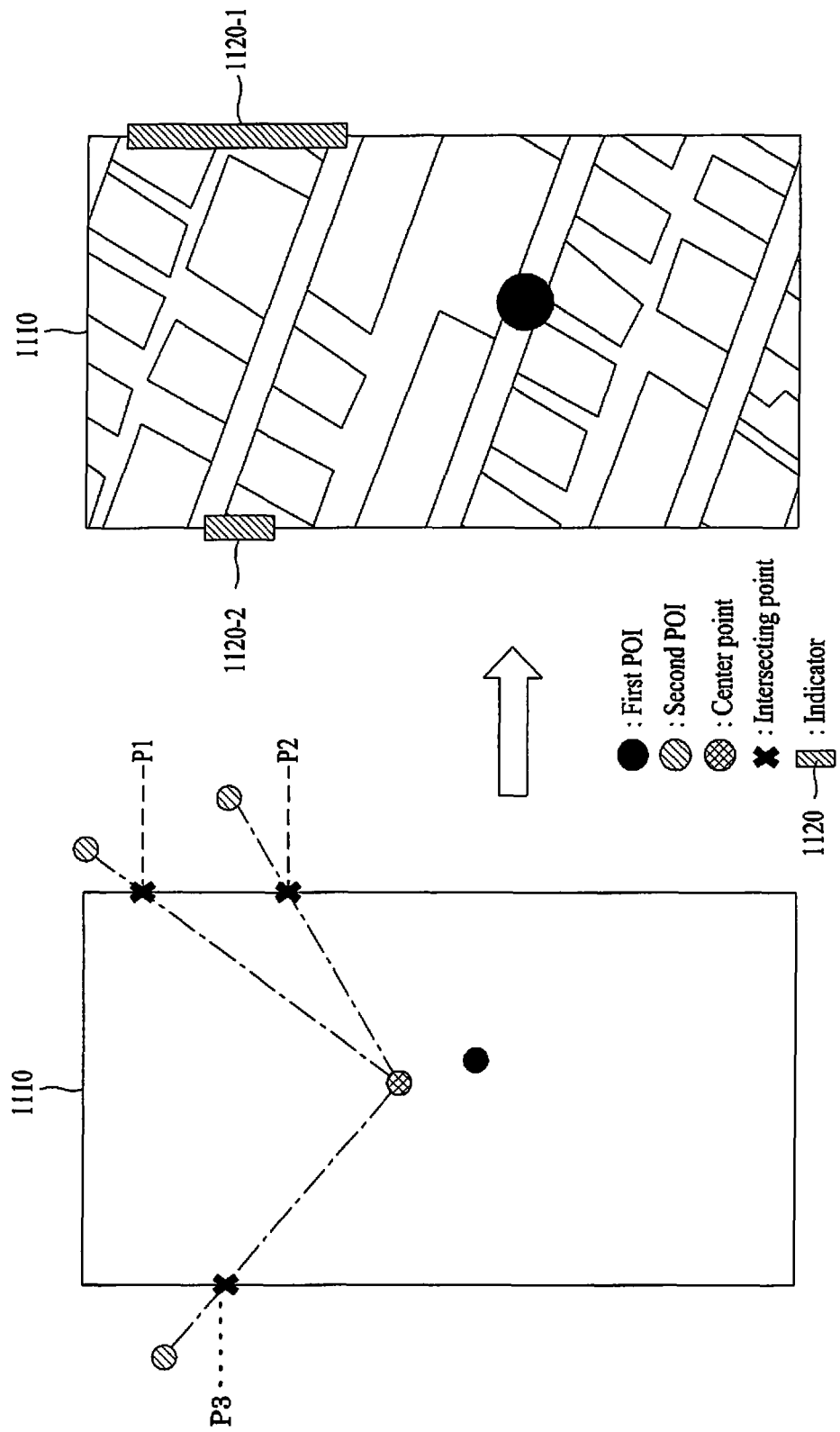

FIG. 11 illustrates an example of a process of displaying an indicator on a map screen displayed on an electronic device according to at least one example embodiment. Referring to FIG. 11, the electronic device 110 may represent an indicator 1120 on an edge line of a valid display area 1110 with respect to each cluster merged through a merging operation. Here, a location and a size of the indicator 1120 to be represented on the map screen may be determined based on the number of clustered coordinate sets, and/or a minimum offset value and a maximum offset value. For example, with respect to three second POIs outside the valid display area 1110, coordinate values P1, P2, and P3 may be mapped to lines that constitute an edge of the valid display area 1110. The coordinate values P1 and P2 may be clustered into a single cluster. In this example, the electronic device 110 may represent the two second POIs present at a right outside of the valid display area 1110 with an indicator 1120-1 having a location and a size that includes the coordinate values P1 and P2 merged into a single cluster, and may indicate the single second POI present at a left outside of the valid display area 1110 with an indicator 1120-2 having a location and a size that includes the coordinate value P3.

Figure 12:
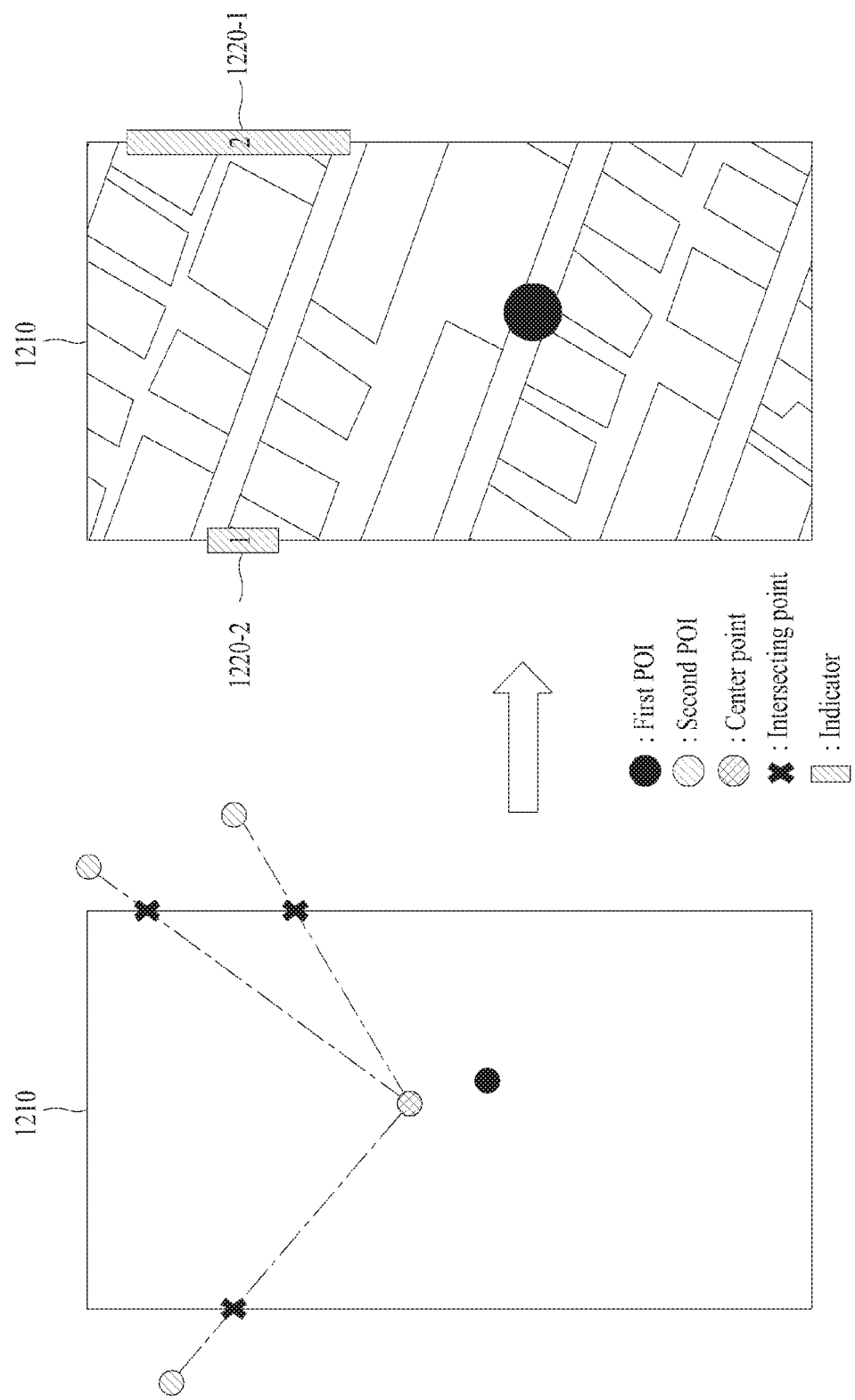

As described above, the electronic device 110 may represent second POIs merged into a single cluster through clustering using a single indicator. In this example, the indicator may further include information about the number of second POIs clustered into a single cluster. For example, referring to FIG. 12, the electronic device 110 may indicate "2" as the number of second POIs present at a right outside of a valid display area 1210 on an indicator 1220-1 displayed on a right straight line of an edge of the valid display area 1210, and may indicate "1" as the number of second POIs present at a left outside of the valid display area 1210 on an indicator 1220-2 displayed on a left straight line of the edge of the valid display area 1210.

The indicator may further include information about a distance between a center point of a valid display area on which a map is displayed and a second POI. For example, the electronic device 110 may indicate the distance between the center point and the second POI by applying a text form, a gauge format gradation, etc., on the indicator. As another example, the electronic device 110 may define a color, a brightness, etc., for each distance range, and may indicate the indicator by applying a color, a brightness, etc., corresponding to the distance between the center point and the second POI. When indicating an indicator with respect to two or more clustered second POIs, the electronic device 110 may combine a plurality of colors on the indicator based on distances from the second POI included in the single cluster, or may apply a distance-based gradation.

Figure 13:
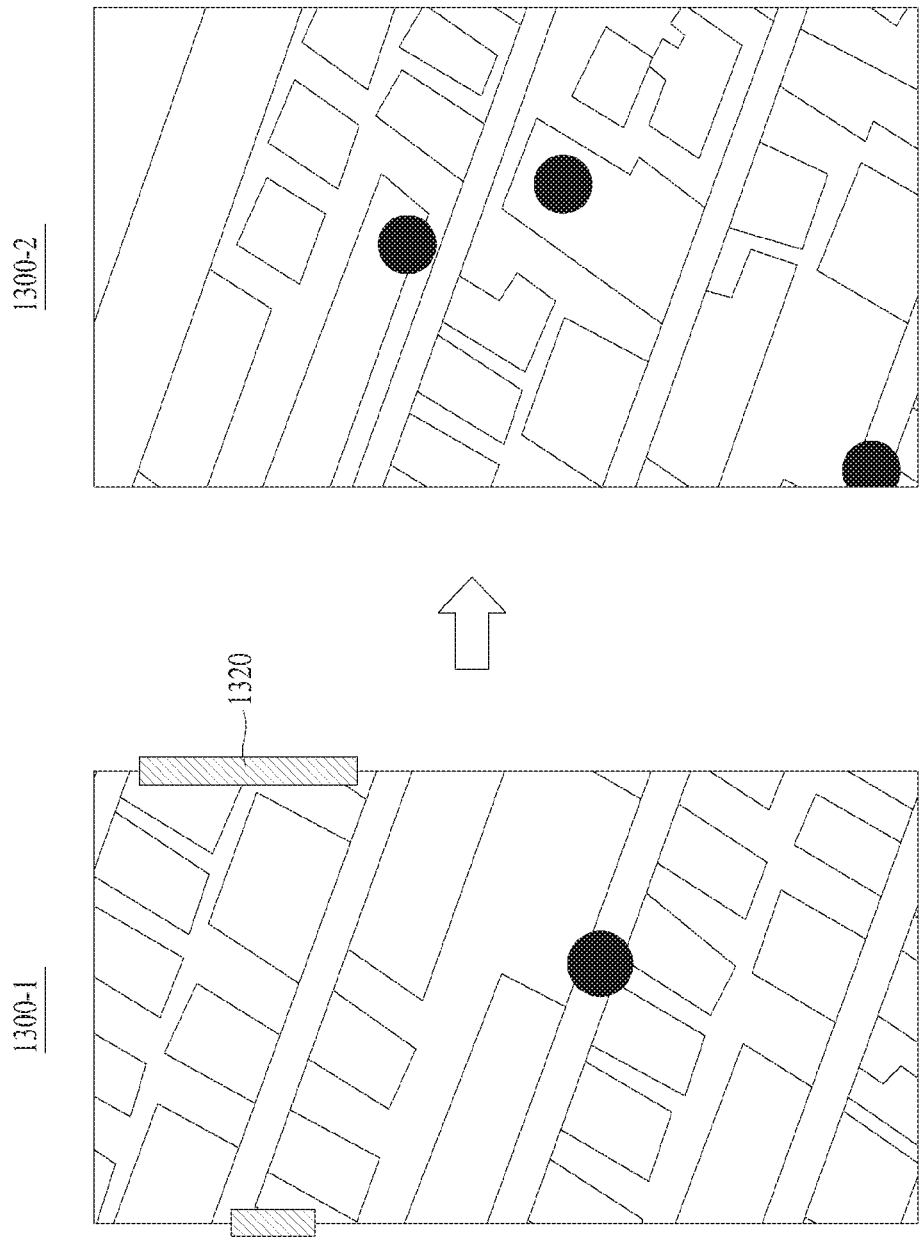
FIGS. 13 through 15 illustrate examples of moving a center of a map using an indicator according to at least one example embodiment.

The electronic device 110 may configure an indicator for a second POI as an action button for moving a center of a map displayed on the screen of the electronic device 110 to an area that includes the second POI. Referring to FIG. 13, in response to a user selection on an indicator 1320 represented on a map screen 1300-1, the electronic device 110 may display a map screen 1300-2 of a corresponding area by automatically switching to a zoom level at which all of POIs indicated by the selected indicator 1320 are in sight. On the map screen 1300-2, the electronic device 110 may identify a second POI(s) outside the range of a map based on a current screen and may newly configure and indicate an indicator for the identified second POI(s).

As another example, the electronic device 110 may configure and indicate an indicator for a second POI outside an enlarged range in an initial enlarged map state, and may configure and display a map screen of an area moved using the indicator as a separate layer, such as a mini map, a pop-up screen, and the like, on an initial enlarged map screen.

Figure 14:
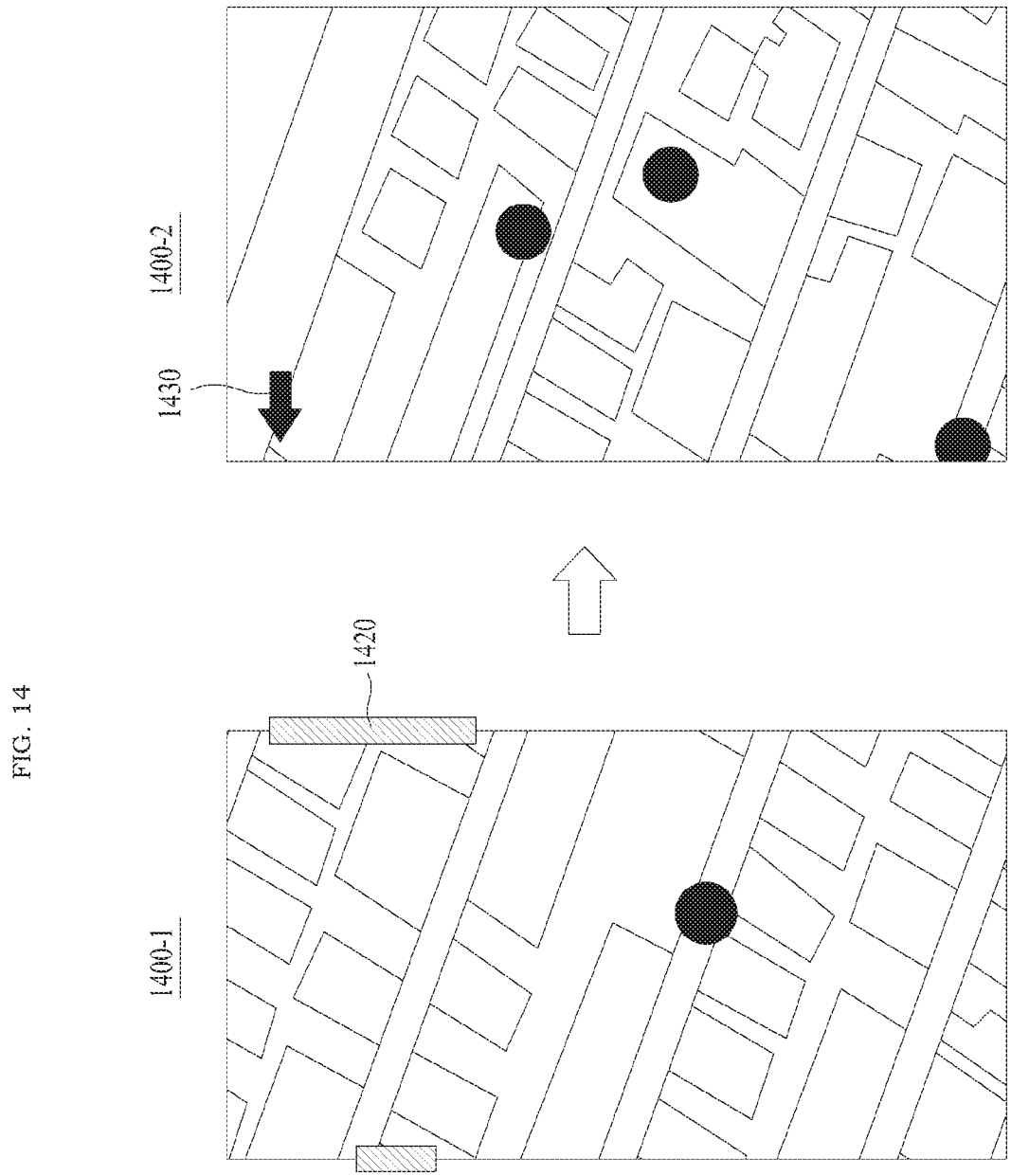
Figure 15:
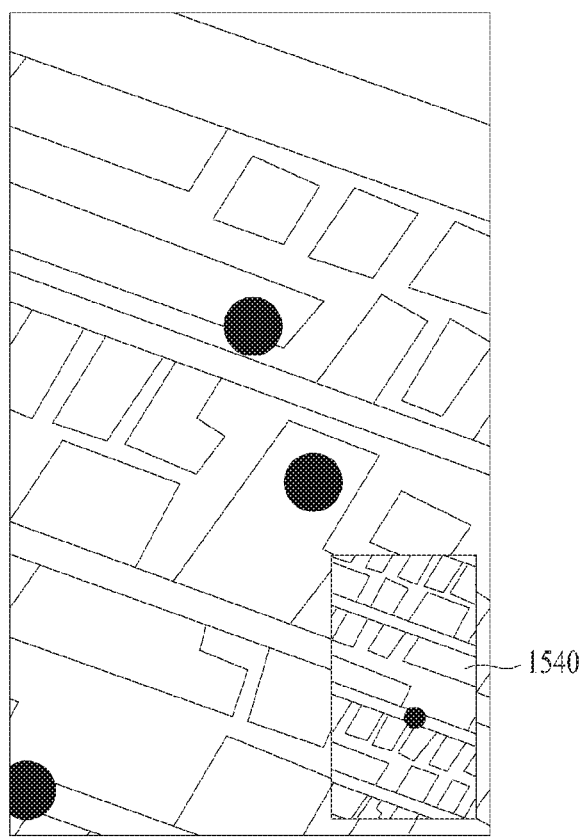

Also, the electronic device 110 may display a user interface for moving back to a previous screen on a current map screen that is displayed by moving a map center using an indicator. For example, referring to FIG. 14, in response to a user selection on an indicator 1420 displayed on a map screen 1400-1, the electronic device 110 may display a map screen 1400-2 of an area on which second POIs indicated by the indicator 1400-2 are in sight. Here, a back button 1430 capable of moving back to the previous map screen 1400-1 may be activated on the map screen 1400-2. As another example, referring to FIG. 15, the electronic device 110 may configure and display a previous screen in a form of a mini map 1540 on a current map screen 1500.

Figure 16:
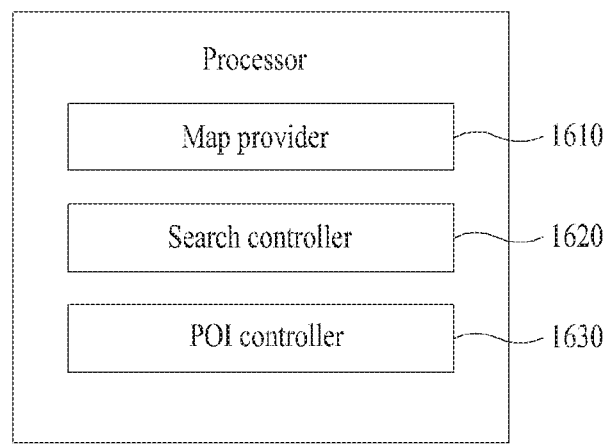
FIG. 16 is a block diagram illustrating an example of constituent elements included in a processor of a server according to at least one example embodiment.
Figure 17:
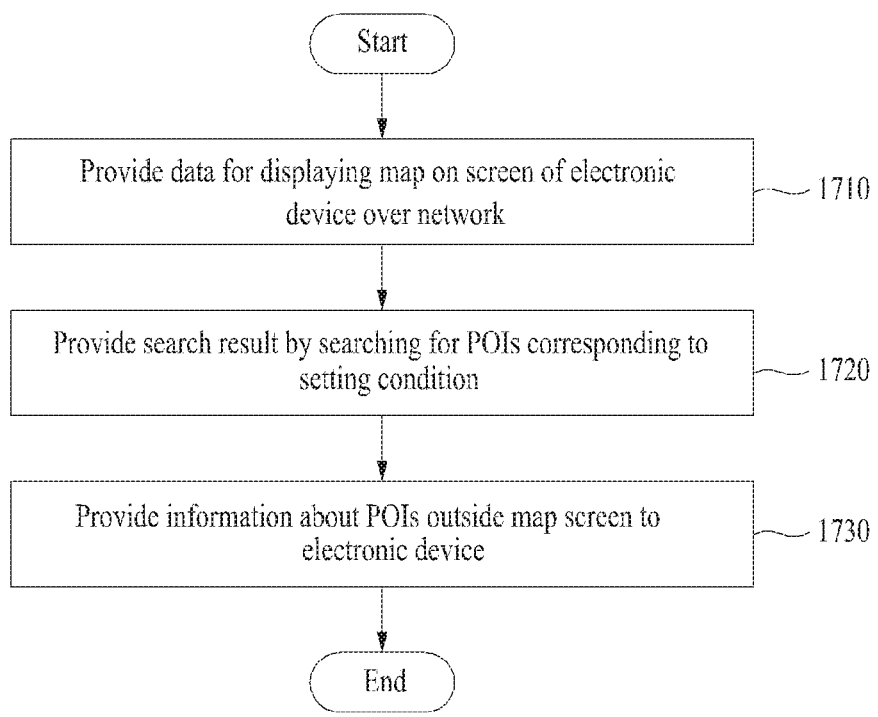
FIG. 17 is a flowchart illustrating a method performed at a server according to at least one example embodiment.

FIG. 16 is a block diagram illustrating an example of constituent elements included in a processor of a server according to at least one example embodiment, and FIG. 17 is a flowchart illustrating a method performed at a server according to at least one example embodiment. Referring to FIG. 16, a processor 222 of a server 150 may include a map provider 1610, a search controller 1620, and a POI controller 1630. The constituent elements of the processor 222 may control the server 150 to perform operations 1710 through 1730 included in the method of FIG. 17, and may be configured to execute at least one program code and/or an OS included in the memory 221.

In operation 1710, the server 150 may transmit, to the electronic device 110, data required for displaying a map on a screen of the electronic device 110 over the network 170 in response to a request from the electronic device 110. The map provider 1610 may control the server 150 to perform operation 1710. The electronic device 110 may configure and display a map screen based on a code received from the server 150.

In operation 1720, the server 150 may search POIs corresponding to a setting condition requested from the electronic device 110, and may transmit search results including the POIs corresponding to the setting condition to the electronic device 110 over the network 170. The search controller 1620 may control the server 150 to perform operation 1720. A POI corresponding to a location on the map displayed on the screen of the electronic device 110 among the POIs included in the search results may be displayed on the map screen displayed on the electronic device 110. POIs outside the range of the map displayed on the screen of the electronic device 110 may be out of sight on the map screen displayed on the electronic device 110.

In operation 1730, the server 150 may transmit, to the electronic device 110, information about POIs outside the range of the map displayed on the electronic device 110 among the POIs included in the search results over the network 170. The POI controller 1630 may control the server 150 to perform operation 1730. The server 150 may control the electronic device 110 to represent the POIs outside the range of the map displayed on the electronic device 110 using a separate indicator. Here, the server 150 may control the electronic device 110 to cluster the POIs outside the range of the map displayed on the electronic device 110 based on, for example, at least one of a distance of the POIs or a direction from a center location of the map screen, and to configure a single indicator based on a clustering result.

An example of representing the POIs outside the map screen using the indicator is described above and thus, a further description is omitted. The features not described in FIGS. 16 and 17 may be understood by referring to the descriptions made with reference to FIGS. 1 through 15.

According to at least some example embodiments, it is possible to enable a user to relatively easily recognize a POI outside a map screen by configuring an indicator indicating a direction and a location of a POI outside the map screen based on a center of a map and by indicating the indicator on the screen. Also, according to at least some example embodiments, it is possible to display an appropriate number of indicators on a map screen by clustering POIs outside the map screen based on a direction from a center location of a screen and by applying a single indicator for the clustered POIs.

The units described herein may be implemented using hardware components, or a combination of hardware and software components. For example, a processing device may be implemented using one or more general-purpose or special purpose computers such as a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular, however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape, optical media such as CD ROM disks and DVD, magneto-optical media such as floptical disks, and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described example embodiments.

The foregoing description has been provided for purposes of illustration and description. It is not intended to be exhaustive or to limit the disclosure. Individual elements or features of a particular example embodiment are generally not limited to that particular example embodiment, but may be varied in many ways. Such variations are not to be regarded as a departure from the disclosure, and all such modifications are intended to be included within the scope of the disclosure.

What is claimed is:
1. A method comprising:
  displaying, at an electronic device, a map received from a server over a network on a screen of the electronic device under control of an application installed on the electronic device;
  sending a request from the electronic device for a search for points of interest (POIs) to the server over the network;
  receiving, at the electronic device, search results for the POIs from the server over the network;

displaying a first POI, among the POIs included in the search results, corresponding to a location within the map displayed on the screen of the electronic device; and representing, on the screen of the electronic device, at least one second POI, among the POIs included in the search results, outside the map displayed on the screen using an indicator, wherein in response to the at least one second POI including a plurality of second POIs, the representing includes, clustering in a single cluster a set of second POIs, among the plurality of second POIs, based on a direction from a center location of the screen, and representing on the map displayed on the screen the set of second POIs included in the single cluster using a single indicator, wherein the clustering includes, generating straight lines that respectively connect locations of the second POIs and a center point of an entirety of the map displayed on the screen of the electronic device, the center point being both a horizontal center point and a vertical center point of the displayed map, mapping intersecting coordinates of the straight lines, the intersecting coordinates being coordinates of points at which the straight lines respectively intersect with a line corresponding to an edge of the screen, and merging into the single cluster two or more of the intersecting coordinates in response to an inter-coordinate distance between respective pairs of the two or more of the intersecting coordinates being less than a threshold value.

2. The method of claim 1, wherein the indicator is indicated on the screen at a location corresponding to the second POI.

3. The method of claim 1, wherein the indicator includes information about at least one of a direction or a distance associated with the second POI with respect to the center location of the screen.

4. The method of claim 1, wherein the clustering comprises clustering POIs present within a radius from a reference point of the map among the second POIs.

5. The method of claim 1, wherein the single indicator includes information about a number of POIs included in the single cluster.

6. The method of claim 1, wherein the representing the set of second POIs included in the single cluster comprises:

determining a location and a size of the indicator for the single cluster based on at least one of a number of the intersecting coordinates merged into the single cluster, a minimum offset value, or a maximum offset value; and representing the single indicator on the line corresponding to the edge of the screen based on determined location and size.

7. The method of claim 1, further comprising:

displaying the set of second POIs included in the single cluster on the screen by moving the center point of the map displayed on the screen of the electronic device in response to selecting the single indicator.

8. The method of claim 1, further comprising:

moving and representing the indicator on the screen in a rotation direction of the map in response to rotating the map displayed on the screen.

9. A method implemented by a computer, the method comprising:

providing data for displaying a map on a screen of an electronic device to the electronic device over a network;

searching for points of interest (POIs) requested by the electronic device, and providing search results for the POIs to the electronic device;

providing information about at least one POI outside the map displayed on the screen of the electronic device among POIs included in the search results to the electronic device;

displaying on the screen a first POT, among the POTs included in the search results, corresponding to a location within the map displayed on the screen among the POIs included in the search results; and representing on the screen using an indicator at least one second POI outside, among the POIs included in the search results, the map displayed on the screen, wherein in response to the at least one second POI including a plurality of second POIs, the representing includes, clustering in a single cluster a set of second POIs, among the plurality of second POIs, based on a direction from a center location of the screen, and representing on the map displayed on the screen the set of second POIs included in the single cluster using a single indicator, wherein the clustering includes, mapping intersecting coordinates of straight lines, the straight lines being lines respectively connecting locations of the second POIs and a center point of an entirety of the map displayed on the screen of the electronic device, the center point being both a horizontal center point and a vertical center point of the displayed map, the intersecting coordinates being coordinates of points at which the straight lines respectively intersect with a line corresponding to an edge of the screen, and merging into a single cluster two or more of the intersecting coordinates in response to an inter-coordinate distance between respective pairs of the two or more of the intersecting coordinates being less than a threshold value.

10. The method of claim 9, wherein the indicator is indicated on the screen at a location corresponding to the second POI.

11. The method of claim 9, wherein the indicator includes information about at least one of a direction or a distance associated with the second POI with respect to the center location of the screen.

12. The method of claim 9, wherein the clustering comprises clustering POIs present within a radius from a reference point of the map among the second POIs.

13. The method of claim 9, wherein the single indicator includes information about a number of POIs included in the single cluster.

14. The method of claim 9, wherein the clustering further includes:

determining a location and a size of the indicator to be represented on the line corresponding to the edge of the screen based on at least one of a number of intersecting coordinates merged into the single cluster, a minimum offset value, or a maximum offset value.

15. The method of claim 9, wherein the single indicator includes an action button for moving the center point of the map displayed on the screen of the electronic device to an area on which the second POIs included in the single cluster are present.

16. A system comprising:
a memory configured to store computer-readable instructions; and
one or more processors configured to execute the computer-readable instructions such that the one or more processors are configured to,
control the system to provide data for displaying a map on a screen of an electronic device to the electronic device over a network,
control the system to search for points of interest (POIs) requested by the electronic device, and provide search results for the POIs to the electronic device,
control the system to provide the search results such that the POIs included in the search results include at least one POI outside the map displayed on the screen of the electronic device,
cause the electronic device to display a POI, among the POIs included in the search results, corresponding to a location within the map displayed on the screen, and
cause the electronic device to represent the at least one POI on the screen of the electronic device using an indicator,
wherein in response to the at least one POI including two or more POIs, the one or more processors are configured to cause the electronic device to represent the at least one POI by
clustering in a single cluster a set of POIs, among the two or more POIs, based on a direction from a center location of the screen, and
representing on the map displayed on the screen the set of POIs included in the single cluster using a single indicator, and
wherein the clustering includes,
generating straight lines that respectively connect locations of the two or more POIs included in the at least one POIs and a center point of an entirety of the map displayed on the screen of the electronic device, the center point being both a horizontal center point and a vertical center point of the displayed map,
mapping intersecting coordinates of the straight lines, the intersecting coordinates being coordinates of points at which the straight lines respectively intersect with a line corresponding to an edge of the screen, and
merging into the single cluster two or more of the intersecting coordinates in response to an inter-coordinate distance between respective pairs of the two or more of the intersecting coordinates being less than a threshold value.

* * * * *